(12) United States Patent
Pienimaa et al.

(10) Patent No.: US 7,997,723 B2
(45) Date of Patent: Aug. 16, 2011

(54) DISPLAY APPARATUS AND DEVICE

(75) Inventors: Seppo Pienimaa, Espoo (FI); Xia Wang, Beijing (CN); Kong Qiao Wang, Beijing (CN); Antti Salo, Lohja (FI); Tapani Levola, Tampere (FI)

(73) Assignee: Nokia Corporation, Espoo (FI)

( * ) Notice: Subject to any disclaimer, the term of this patent is extended or adjusted under 35 U.S.C. 154(b) by 353 days.

(21) Appl. No.: 12/347,261

(22) Filed: Dec. 31, 2008

(65) Prior Publication Data
US 2010/0165287 A1 Jul. 1, 2010

(51) Int. Cl.
G02C 1/00 (2006.01)
G02B 6/26 (2006.01)

(52) U.S. Cl. ............... 351/158; 385/31; 359/15; 359/16

(58) Field of Classification Search ............... 351/158, 351/41; 359/31, 15, 16, 17, 71; 235/426; 385/31
See application file for complete search history.

(56) References Cited

U.S. PATENT DOCUMENTS

| | | | |
|---|---|---|---|
| 4,753,514 A | 6/1988 | Kubik | |
| 5,224,198 A | 6/1993 | Jachimowicz et al. | |
| 5,281,957 A | 1/1994 | Schoolman | |
| 5,469,185 A | 11/1995 | Lebby et al. | |
| 5,579,026 A | 11/1996 | Tabata | |
| 6,091,546 A | 7/2000 | Spitzer | |
| D446,783 S | 8/2001 | Bumgardner | |
| 6,346,929 B1 | 2/2002 | Fukushima et al. | |
| 6,349,001 B1 | 2/2002 | Spitzer | |
| 6,474,808 B1 | 11/2002 | Bettinger | |
| 6,474,809 B2 | 11/2002 | Tanijiri et al. | |
| 7,418,170 B2 * | 8/2008 | Mukawa et al. | ............... 385/31 |
| 2002/0036751 A1 | 3/2002 | Tanijiri et al. | |
| 2006/0007056 A1 | 1/2006 | Ou | |
| 2006/0132914 A1 | 6/2006 | Weiss et al. | |
| 2006/0221448 A1 | 10/2006 | Nivon et al. | |

FOREIGN PATENT DOCUMENTS

| | | |
|---|---|---|
| EP | 0773494 A1 | 5/1997 |
| EP | 0 942 307 A2 | 9/1999 |
| JP | 3-132180 A | 6/1991 |
| JP | 2007011057 A | 1/2007 |
| WO | 03003185 A1 | 1/2003 |
| WO | 2007085682 A1 | 8/2007 |
| WO | 2008038058 A1 | 4/2008 |
| WO | 2008089992 A1 | 7/2008 |

OTHER PUBLICATIONS

Kasai, Ichiro, et al., "A Forgettable Near Eye Display," IEEE 2000.
International Search Report dated Feb. 24, 2010.

* cited by examiner

*Primary Examiner* — Hung Dang
(74) *Attorney, Agent, or Firm* — Perman & Green, LLP

(57) ABSTRACT

A near-eye display related apparatus and device is disclosed. The apparatus includes a housing configured to receive an optical engine, and a light guiding plate attached to the housing and configured to receive light representing an image from the optical engine, the light guiding plate includes a first diffractive grating adapted to incouple the light into the light guiding plate, and a second diffractive grating adapted to outcouple the light from the light guiding plate such that the light is received by an eye of a user wearing the apparatus. The light guiding plate has a contact surface portion configured to optically couple the light guiding plate to a transparent plate, The contact surface portion being adapted to be in physical contact with the transparent plate.

22 Claims, 4 Drawing Sheets

DISPLAY APPARATUS AND DEVICE

FIELD

The disclosed embodiments relate in general to displays of electronic devices and in particular, but not exclusively, to near-eye displays.

BACKGROUND

Traditionally, displays of electronic devices have formed a part of an electronic device or been connected to the electronic device by means of a cable or other wired or wireless connection. Examples of such displays are the displays of a mobile phone and a desktop or a deskside computer. These displays provide a small-size or large-size, TV-like view on the information shown on the display.

Wearable displays, such as near-eye displays, have also been developed. Near-eye-type displays can e.g. be used for shifting the TV-like user experience towards a virtual presence in the displayed scene type user experience.

SUMMARY

Typically, near-eye displays have been bulky and heavy special devices that may require a cable connection to a controller. Near-eye displays may also require auxiliary devices, such as data gloves, for controlling the information displayed on the near-eye displays. These auxiliary devices may also require cable connections to a common controller. Near-eye displays may also completely block a user's view of the surrounding real world. If the user wishes to shift his presence from a virtual world created by the information displayed on the near-eye display to the real world, the user may need to remove the near-eye display device he is wearing.

Particular embodiments of the invention aim at addressing at least some of the issues discussed above. According to a first aspect there is provided an apparatus comprising a housing configured to receive an optical engine, and a light guiding plate attached to the housing and configured to receive light representing an image from the optical engine, the light guiding plate comprising a first diffractive grating adapted to incouple the light into the light guiding plate, and a second diffractive grating adapted to outcouple the light from the light guiding plate such that the light is received by an eye of a user wearing the apparatus, the light guiding plate comprising a contact surface portion configured to optically couple the light guiding plate to a transparent plate, the contact surface portion being adapted to be in physical contact with the transparent plate.

According to a second aspect there is provided a device comprising a mounting part enabling a user to wear the device, a support plate attached to the mounting part, the support plate comprising an optical surface structure near an edge of the support plate, the optical surface structure being configured to display an object, and an apparatus attached to the support plate, the apparatus comprising a housing configured to receive an optical engine, and a light guiding plate attached to the housing and configured to receive light representing an image from the optical engine, the light guiding plate comprising a first diffractive grating adapted to incouple the light into the light guiding plate, and a second diffractive grating adapted to outcouple the light from the light guiding plate such that the light is received by an eye of the user wearing the apparatus, the light guiding plate comprising a contact surface portion configured to optically couple the light guiding plate to the support plate, the contact surface portion being adapted to be in physical contact with the support plate, wherein the light guiding plate is configured to display a workspace.

The aspects described hereinbefore represent non-limiting examples of the invention. Various exemplary embodiments of the invention are described hereinafter in the detailed description as well as in the dependent claims appended hereto. The embodiments are described with reference to selected aspects. A person skilled in the art appreciates that any embodiment may apply to a particular aspect either alone or in combination with other embodiments.

BRIEF DESCRIPTION OF THE DRAWINGS

The invention will be described, by way of example only, with reference to the accompanying drawings, in which.

DETAILED DESCRIPTION

In the following description, like numbers denote like elements.

Figure 1:
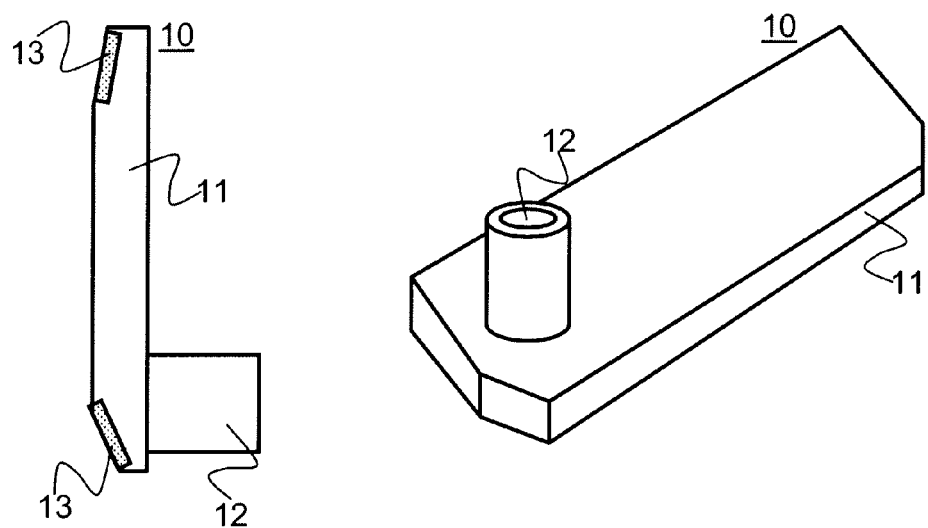
FIG. 1 shows a simplified picture with views from two angles of an apparatus according to an embodiment of the invention.

FIG. 1 depicts, in a simplified view from two angles, an apparatus 10 according to an exemplary embodiment of the invention. The apparatus 10 of FIG. 1 comprises a housing 12 configured to receive an optical engine, and a light guiding plate 11 attached to the housing 12. The light guiding plate 11 is configured to receive light representing an image from an optical engine that is received by the housing 12. The light guiding plate 11 comprises a diffractive grating adapted to incouple light into the light guiding plate 11, and another diffractive grating adapted to outcouple light from the light guiding plate 11. The outcoupled light, and the image represented by the light, may be received by an eye of a user wearing the apparatus.

The apparatus 10 further comprises a contact surface portion 13 configured to optically couple the light guiding plate 11 to another transparent plate, such as an eyeglass lens. The contact surface portion 13 is adapted to provide the optical coupling via a physical contact to the other transparent plate.

FIG. 1 shows two contact surface portions 13, but the number of the contact surface portions may vary according to e.g. design-specific needs. For example, the light guiding plate 11 may comprise one contact surface portion 13. The contact surface portion 13 may be a surface portion of any size and shape, which is effected on the surface of the light guiding plate 11 and which has an adequate optical quality for allowing light to traverse through the contact surface portion substantially without distortion.

The material of the light guiding plate 11, as well as the further transparent plate, may be e.g. optical quality plastic or glass. The light guiding plate may be composed of a plurality of refractive and reflective layers (not shown in FIG. 1) in order to improve colour uniformity. The diffractive grating may be manufactured on the light guiding plate 11 material e.g. by etching or embossing. The light guiding plate may be configured to outcouple the light in the form of a plurality of parallel light beams.

For example, the light guiding plate 11 may comprise a number of layers of optical material, each having an input diffractive grating and an output diffractive grating. Incoming light enters the first layer of the light guiding plate 11 through the input diffractive grating of the first layer and exits the first layer through the output diffractive grating, entering the second layer through the input diffractive grating of the second layer. The light then exits the light guiding plate through the output diffractive grating of the last layer. In order to achieve a distribution of different color components, such as red, green, and blue, in the exit light beam that substantially corresponds to the distribution of the color components in the incoming light beam, the diffractive gratings in each layer may be configured differently so as to control the traversal of the color components between the layers.

The optical engine that the housing 12 is configured to receive, may comprise a microdisplay, such as a Quarter Video Graphics Array (QVGA) display or a Wide QVGA (WQVGA) display, and a suitable lens arrangement.

Figure 1A:
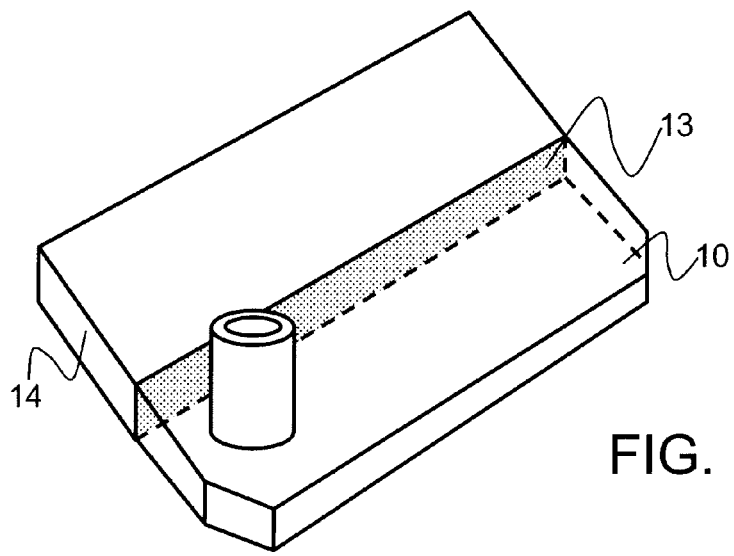
FIG. 1A shows a simplified schematic view of an apparatus according to an embodiment.

FIG. 1A shows a simplified schematic view of an apparatus 10 according to an exemplary embodiment. FIG. 1A shows the apparatus 10 and another transparent plate 14, which may be e.g. an eyeglass lens. FIG. 1A further shows a contact surface portion 13 configured to effect an optical contact between the apparatus and the other transparent plate 14. In the embodiment of FIG. 1A, the contact surface portion is arranged along the top edge of the apparatus 10. As shown in FIG. 1A, the contact surface portion 13 is in contact with the bottom edge of the transparent plate 14.

Figure 1B:
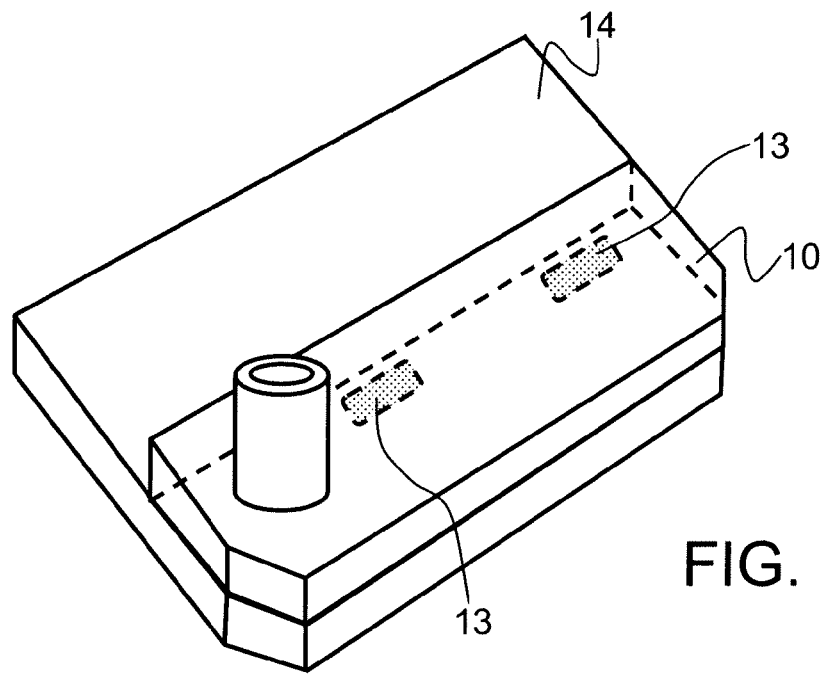
FIG. 1B shows a simplified schematic view of an apparatus according to another embodiment.

FIG. 1B shows a simplified schematic view of an apparatus 10 according to another exemplary embodiment. FIG. 1B shows the apparatus 10 and another transparent plate 14, which may be e.g. an eyeglass lens. FIG. 1B further shows two contact surface portions 13 configured to effect an optical contact between the apparatus 10 and the other transparent plate 14. In the embodiment depicted in FIG. 1B, the apparatus 10 and the other transparent plate 14 are positioned such that the back or the front side of the apparatus 10 covers a corresponding portion of the back or front side of the other transparent plate 14. For example, if the transparent plate 14 is an eyeglass lens, the apparatus 10 may cover the reading spectacle area of the lens. According to the embodiment depicted in FIG. 1B, the apparatus 10 may be positioned in front of or behind the transparent plate 14. In other words, if the transparent plate is an eyeglass lens, the apparatus 10 may be positioned in front of the lens or behind the lens, when observed from the direction of a user's eye. As shown in FIG. 1B, the contact surface portions 13 are discrete areas on the surface of the apparatus, which is in contact with the other transparent plate.

Figure 1C:
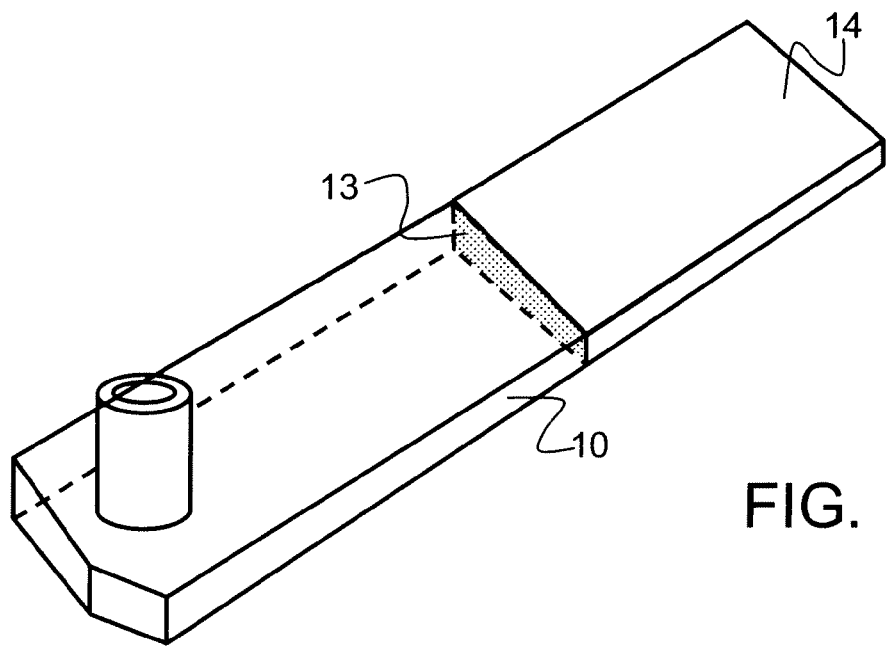
FIG. 1C shows a simplified schematic view of an apparatus according to a further embodiment.

FIG. 1C shows a simplified schematic view of an apparatus 10 according to a further exemplary embodiment. FIG. 1C shows the apparatus 10 and another transparent plate 14, which may be e.g. an eyeglass lens. FIG. 1B further shows a contact surface portion 13 configured to effect an optical contact between the apparatus 10 and the other transparent plate 14. In the embodiment depicted in FIG. 1C, the contact surface portion 13 is arranged along the side edge of the apparatus 10 that comes into contact with the corresponding side edge of the transparent plate 14.

The various types of contact surface portions 13 depicted in FIGS. 1 to 1C may be adapted to guide to the other transparent/optical plate 14 at least a portion light originating from an optical engine and directed towards an optical surface structure that is located close to an edge of the other transparent/optical plate. In other words, the contact surface portions may be configured to outcouple light that is directed outside the display or exit pupil area of the light guiding plate 11.

As noted hereinbefore, the apparatus 10 shown in FIGS. 1 to 1C comprises an input diffractive grating (not shown) adapted to convey light from an optical engine to the light guiding plate 11, in which the light then propagates according to the principle of total reflection until the propagation of the light is intercepted e.g. by an outcoupling optical element. The input diffractive grating is positioned such that the position matches the position of the housing 12. The input diffractive grating may be e.g. the input diffractive grating of the top layer of a light guiding plate having a layer structure, as described hereinbefore.

The light guiding plate 11 may operate as an exit pupil expander, and be configured to outcouple light in the form of a plurality of parallel light beams so as to enable a clear image when the apparatus 10 is in proximity of a user's eye. The output beams may be modified by altering the configuration of the diffractive gratings of the light guiding plate 11 in a similar manner as described hereinbefore in connection with the discussion of color components.

The light guiding plate 11 may be adapted to comply with the shape of the other transparent plate 14, with which the light guiding plate 11 of the apparatus 10 comes into contact with. For example, the light guiding plate 11 may be manufactured such that the curve radius of the surface matches the curve radius of the surface of an eyeglass lens, to which the apparatus 10 is intended to be attached e.g. as a clip-on accessory. The space between the apparatus 10 and the other optical plate or lens 14 may be filled e.g. with optical elastomer or the like.

The apparatus 10 may further comprise a liquid crystal shutter (not shown in FIGS. 1 to 1C) mounted thereto. The liquid crystal shutter may be configured to be switched on in parallel with a microdisplay of an optical engine that is received by the housing 12. In a switched-on state, the liquid crystal shutter is opaque, preventing ambient light to traverse trough the shutter, thereby enabling a user to see an image conveyed from an optical engine received by the housing 12 through the apparatus 10 to the user's eye. In a switched-off state, the liquid crystal shutter 23 is transparent, allowing the shutter to be seen through.

The liquid crystal shutter may receive its operating voltage from a common source, such as a battery, shared with the microdisplay and possibly with other components described hereinafter.

Figure 2:
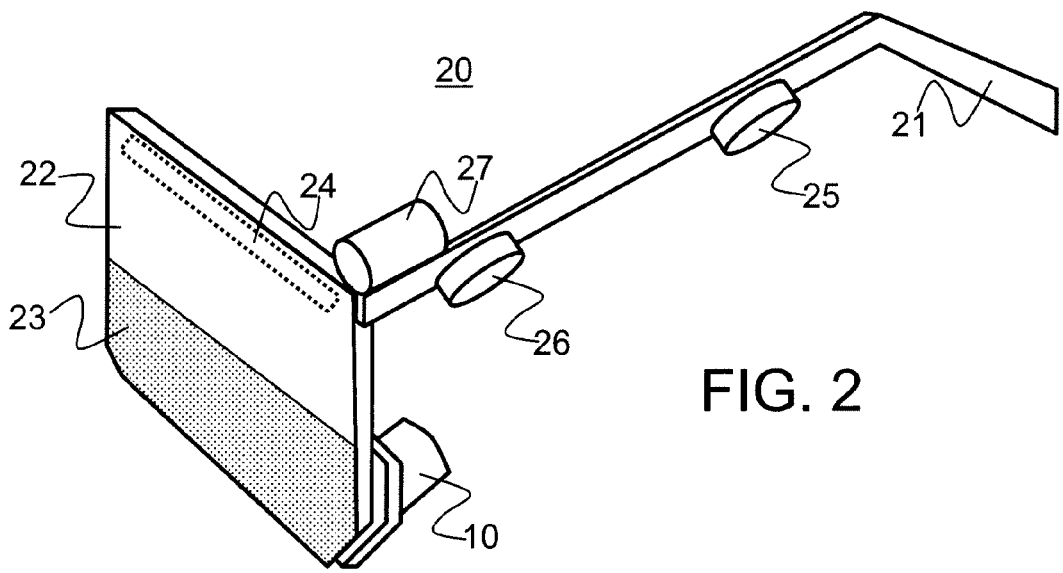
FIG. 2 shows a simplified picture of a device according to an embodiment.

FIG. 2 shows a simplified picture of a device 20 according to an exemplary embodiment. The device 20 of FIG. 2 comprises a mounting part 21 enabling a user to wear the device 20 such that a display part comprising e.g. a support plate 22 can be positioned in front of the user's eye. The mounting part 21 may comprise e.g. an ear stem. The device 20 may further comprise a nose rest (not shown in FIG. 2).

The device 20 further comprises said support plate 22 attached to the mounting part 21, and the apparatus 10 described herein with reference to FIGS. 1 to 1C. The support plate 22 may comprise an optical surface structure 24 positioned close to an edge of the support plate 20, wherein the optical surface structure 24 is configured to display an object. The displaying of the object is effected by guiding at least a portion of light originating from an optical engine through the contact surface portion 13 of the light guiding plate 11 to the support plate 22. Said portion of the light then exits from the support plate through the optical surface structure 24. The object may be e.g. an icon of a graphical user interface displayed for selection by the user of the device 20.

The light guiding plate of the apparatus 10 may be configured to display to the user a workspace forming part of the graphical user interface together with the object displayed by the optical surface structure 24 arranged on the support plate 22. The graphical user interface may represent e.g. the user interface of an electronic device.

The device 20 may be e.g. a half-pair of eyeglasses, as illustrated by the exemplary embodiment of FIG. 2. The support plate 22 may be e.g. an optical lens providing a corrected vision for a user wearing the device 20, or the support plate 22 may be optically neutral. The material of the support plate 22 may be e.g. optical plastic or glass of optical quality.

In case the apparatus 10 does not comprise a liquid crystal shutter as described hereinbefore, the support plate 22 may further comprise a liquid crystal shutter 23 mounted thereto. The liquid crystal shutter 23 may be configured to be switched on in parallel with a microdisplay of an optical engine that is received by the housing 12. In a switched-on state, the liquid crystal shutter 23 is opaque, preventing ambient light to traverse trough the support plate 22, thereby enabling a user to see an image conveyed from an optical engine received by the housing 12 through the apparatus 10 to the user's eye. The apparatus 10 may be attached to the support plate 22 such that the position of the apparatus 10 corresponds to the position of the liquid crystal shutter to achieve a good ambient light prevention effect by the liquid crystal shutter 23. In a switched-off state, the liquid crystal shutter 23 is transparent, allowing the shutter to be seen through.

The liquid crystal shutter may receive its operating voltage from a common source, such as a battery, shared with the optical engine and possibly with other components described hereinafter.

In case the support plate 22 is an eyeglass lens comprising a reading spectacle part, the liquid crystal shutter 23, as well as the apparatus 10, particularly its light guiding plate 11, may be adapted to cover the reading spectacle part of the eyeglass lens. In this scenario, the reading spectacle portion of the lens is available for reading when the liquid crystal shutter is in a switched-off state, i.e. transparent.

As described hereinbefore, the support plate 22 may further comprise an optical surface structure 24 located close to an edge of the support plate, for example close to the top edge of the support plate 22. The optical surface structure 24 may be configured to outcouple light that is coupled in to the support plate 22 through an optical coupling effected by the contact surface portion 13 of the apparatus 10, as described hereinbefore e.g. with reference to FIGS. 1A to 1C (the support plate 22 representing the transparent optical plate 14). The optical surface structure 24 may be e.g. a reflective structure, a refractive structure, a diffractive structure or a combination thereof.

The optical surface structure 24 may be adapted to display small-sized objects in the peripheral vision field of a user wearing the device. The optical surface structure 24 may be such that the objects are shown as light spots or figures with characterizing features. Such objects may include e.g. icons of a user interface of an electronic device. A user wearing the device 20 may be able to activate, or select, these icons using e.g. voice commands or hand movements.

The device 20 may further comprise a microphone 26 and a speaker 25. They may be adapted to be used as an accessory microphone and speaker together with an electronic device, such as a mobile phone. The microphone 26 may also be adapted to receive voice commands from a user wearing the device 20, as described hereinafter e.g. in connection with FIG. 4.

The device 20 may further comprise short range communication means (not shown), such as radio interface module(s), antenna(s), wired interface modules, and related processing circuitry adapted to communicate with an electronic device, such as a mobile phone, a computer, a personal digital assistant, a handheld computer, a music player, a game console, or the like. The device 20 may e.g. receive data to be displayed on the apparatus 10 via the communication means from the electronic device. The device 20 may also send data, such as voice data captured by the microphone 26 to the electronic apparatus via the communication means for processing by the processor of the electronic device. The device 20 may receive the processing results from the electronic device via the communication means. The device 20 may also comprise a processor (not shown) in case data processing on the device's 20 own processor is required.

As indicated hereinbefore, the apparatus 10 mounted on the device 20 may be configured to display a user interface of an electronic device. The user interface displayed by the apparatus 10 may be adapted to the current environment of the user wearing the device 20. For example, the user may wear sensors on his arms that measure acceleration of the arms. A particular acceleration pattern may be interpreted for example as indicating that the user has gone jogging. Responsive to this interpretation, the user interface displayed on the apparatus 10 may be modified to correspond to the jogging state of the user. The sensor data may be received and processed by the electronic device, the user interface of which is displayed on the apparatus 10, or the sensor data may be received and processed by a processor mounted on the device 20 (not shown in FIG. 2).

The device 20 may further comprise a camera 27 configured to capture hand movements of the user wearing the device 20. The user's hand movement capturing may be further facilitated by e.g. tags and sensors that the user wears on his hand(s). The captured movement data may be processed by processed by the electronic device, the user interface of which is displayed on the apparatus 10, or the sensor data may be received and processed by a processor mounted on the device 20 (not shown in FIG. 2).

Figure 3:
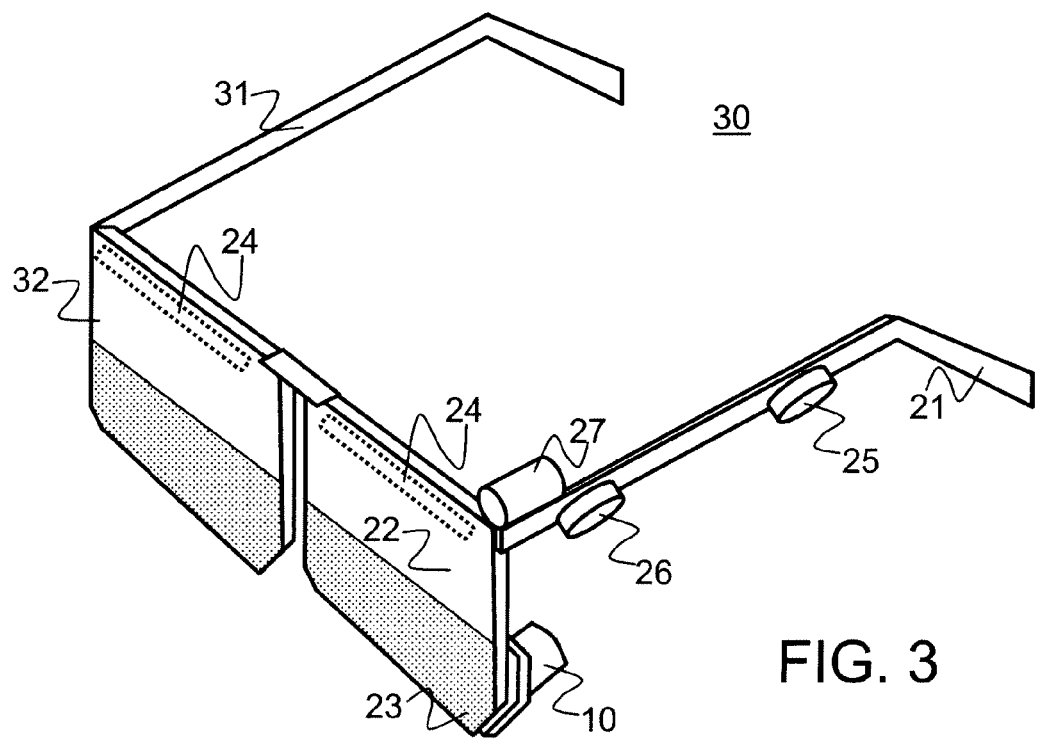
FIG. 3 shows a simplified picture of a device according to another embodiment.

FIG. 3 shows a simplified picture of a device 30 according to another embodiment. The exemplary device 30 represents a pair of eyeglasses type of device. The device 30 comprises mounting parts 21, 31 enabling a user to wear the device 30 such that a display part comprising e.g. support plates 22, 32 can be positioned in front of the user's eye. The mounting parts 21, 31 may comprise e.g. ear stems. The device 30 may further comprise a nose rest (not shown in FIG. 3).

The device 30 further comprises an apparatus 10 described hereinbefore e.g. with reference to FIGS. 1 to 1C. The device 30 may further comprise a liquid crystal shutter 23, an optical surface structure 24, a speaker 25, a microphone 26, and a camera 27. These components have been described hereinbefore in connection with FIG. 2. The device 30 may comprise two liquid crystal shutters 23, two optical surface structures 24, two apparatuses 10, two speakers 25, two microphones 26, and two cameras 27.

Figure 4:
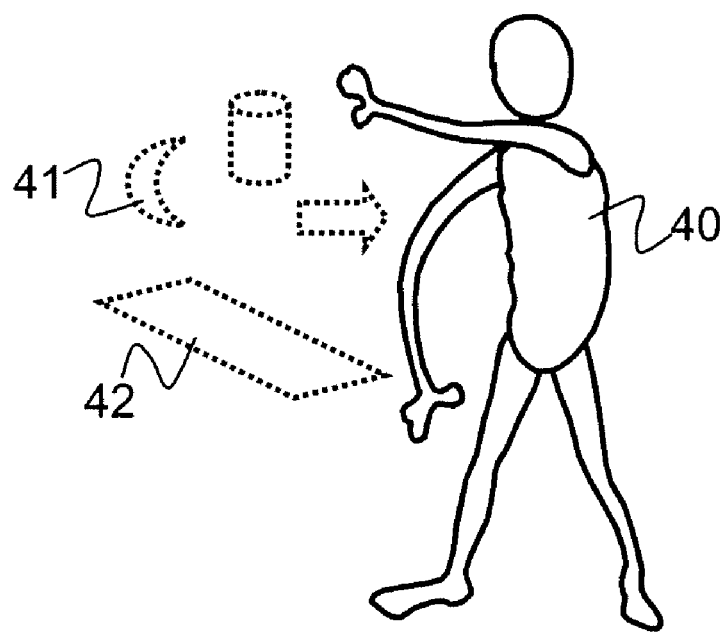
FIG. 4 illustrates a virtual user interface according to an embodiment as experienced by a user.

FIG. 4 illustrates a virtual user interface according to an embodiment as experienced by a user. The virtual user interface illustrated in FIG. 4 may be enabled by the device 20 of FIG. 2 or the device 30 of FIG. 3.

According to the embodiment of FIG. 4, the user 40 sees a virtual user interface comprising icons 41 and a virtual workspace 42. The virtual user interface may enable the user 40 e.g. to activate, or select, an icon 41 by touching it with his hand. The user may also be able to display the content represented by an icon 41 by seizing and dragging the icon 41 on to the virtual workspace 42.

The visualization of the icons 41 may be enabled by displaying images of the icons 41 through the optical surface structure(s) 24 depicted in FIGS. 2 and 3 at the top portion of the user's 40 field of vision. Similarly, the visualization of the virtual workspace 42 may be enabled by showing an image of the workspace via the apparatus(es) 10 shown in FIGS. 2 and 3.

As mentioned hereinbefore, the user's 40 hand movements may be detected by the camera(s) 27 shown in FIGS. 2 and 3, as well as sensors attached e.g. to the user's palm(s) and finger(s). The sensor data may be received and processed by a processor of the electronic device, the user interface of which is represented by the virtual user interface, or a processor mounted on a device 20, 30 shown in FIGS. 2 and 3.

The user 40 may also control the virtual user interface by voice commands captured by the microphone 26 shown in FIGS. 2 and 3. The voice commands may be received and processed by a processor of the electronic device, the user interface of which is represented by the virtual user interface, or a processor mounted on a device 20, 30 shown in FIGS. 2 and 3.

The icons 41 and the virtual workspace 42 may be different in different situations and environments, and in some situations and environments some (or even all) user interface objects may be missing. For example, different icons 41 may be shown, when the user is in his car or gone jogging. As mentioned earlier, the user's 40 motion status may be detected by sensors. The user's 40 location may be determined e.g. by signals transmitted by tags or the like. The sensor and tag data may be received and processed by a processor of the electronic device, the user interface of which is represented by the virtual user interface, or a processor mounted on a device 20, 30 shown in FIGS. 2 and 3.

At least some embodiments of the invention enable the realization of a thin near-eye display arrangement, which can be used to effect a virtual user interface for an electronic device, such as a mobile phone, a computer, a personal digital assistant, a handheld computer, a music player, a game console, or the like. The virtual user interface may be controlled by a user's hand movements, voice commands, or both. The virtual user interface may also be adapted to be best suited for a user's present situation and/or location.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means without deviating from the characteristics of the invention.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

We claim:

1. An apparatus comprising:
a housing configured to receive an optical engine; and
a light guiding plate attached to the housing and configured to receive light representing an image from the optical engine, the light guiding plate comprising a first diffractive grating adapted to incouple the light into the light guiding plate, and a second diffractive grating adapted to outcouple the light from the light guiding plate such that the light is received by an eye of a user wearing the apparatus, the light guiding plate comprising a contact surface portion configured to optically couple the light guiding plate to a transparent plate, the contact surface portion being adapted to be in physical contact with the transparent plate, wherein the light guiding plate is adapted to follow the shape of the transparent plate.

2. An apparatus according to claim 1, wherein the optical engine comprises a microdisplay and a lens arrangement.

3. An apparatus according to claim 1, wherein the light guiding plate comprises a plurality of refractive layers.

4. An apparatus according to claim 1, wherein the light guiding plate is configured to outcouple the light in the form of a plurality of parallel light beams.

5. An apparatus according to claim 1, wherein the contact surface portion is configured to guide to the transparent plate a portion of the light originating from the optical engine and directed toward an optical surface structure located near an edge of the transparent plate.

6. An apparatus according to claim 1, wherein the transparent plate is an eyeglass lens.

7. An apparatus according to claim 1, wherein the apparatus further comprises a liquid crystal shutter attached to the light guiding plate.

8. An apparatus according to claim 7, wherein the liquid crystal shutter is switched on in parallel with the optical engine.

9. An apparatus according to claim 1, wherein the apparatus comprises a clip-on accessory to eyeglasses.

10. A device comprising:
a mounting part enabling a user to wear the device;
a support plate attached to the mounting part, the support plate comprising an optical surface structure near an edge of the support plate, the optical surface structure being configured to display an object; and
an apparatus attached to the support plate, the apparatus comprising:
a housing configured to receive an optical engine; and
a light guiding plate attached to the housing and configured to receive light representing an image from the optical engine, the light guiding plate comprising a first diffractive grating adapted to incouple the light into the light guiding plate, and a second diffractive grating adapted to outcouple the light from the light guiding plate such that the light is received by an eye of the user wearing the apparatus, the light guiding plate comprising a contact surface portion configured to optically couple the light guiding plate to the support plate, the contact surface portion being adapted to be in physical contact with the support plate, wherein the light guiding plate is configured to display a workspace, wherein the light guiding plate is adapted to follow the shape of the support plate.

11. A device according to claim 10, wherein the contact surface portion is configured to guide to the optical surface structure of the support plate a portion of the light originating from the optical engine.

12. A device according to claim 11, wherein the optical surface structure is configured to outcouple light that is coupled in to the support plate via the optical coupling provided by the contact surface portion.

13. A device according to claim 12, wherein the optical surface structure is selected from a group consisting of a reflective structure, a refractive structure, and a diffractive structure.

14. A device according to claim 10, wherein the device comprises a pair of eyeglasses and the support plate comprises an eyeglass lens.

15. A device according to claim 14, wherein the position of the apparatus corresponds to the position of the reading spectacle portion of the eyeglass lens.

16. A device according to claim 10, wherein the mounting part comprises an ear stem.

17. A device according to claim 10, wherein the object comprises an icon displayed for selection by the user.

18. A device according to claim 17, wherein the icon is configured to be activated by a hand movement of the user.

19. A device according to claim 18, wherein the device further comprises a camera configured to capture the hand movement of the user.

20. A device according to claim 17, wherein the icon and the workspace forms a part of a user interface of an electronic device.

21. A device according to claim 20, wherein the user interface is modified according to the environment of the user.

22. A device according to claim 10, wherein the device further comprises a microphone and a speaker.

\* \* \* \* \*